United States Patent [19]

Kawaberi et al.

[11] Patent Number: 5,019,953
[45] Date of Patent: May 28, 1991

[54] HIGH VOLTAGE GENERATOR FOR TELEVISION RECEIVER

[75] Inventors: Seiji Kawaberi; Hisashi Iwamoto, both of Kanagawa, Japan

[73] Assignee: Sony Corporation, Tokyo, Japan

[21] Appl. No.: 483,861

[22] Filed: Feb. 23, 1990

[30] Foreign Application Priority Data

Feb. 23, 1989 [JP] Japan .................................. 1-41911

[51] Int. Cl.[5] ..................... H04N 3/185; H02M 3/335
[52] U.S. Cl. ........................................ 363/21; 315/411
[58] Field of Search ................. 315/411; 363/2 D, 21, 363/131; 323/224

[56] References Cited

U.S. PATENT DOCUMENTS 4,774,584  9/1988  Schmadel ............................. 363/21
4,954,758  9/1990  Rusk ................................... 315/411
4,958,110  9/1990  Hayase ............................... 315/411

Primary Examiner—William H. Beha, Jr.
Attorney, Agent, or Firm—Hill, Van Santen, Steadman & Simpson

[57] ABSTRACT

A high voltage generator using a flyback transformer to generate high voltage pulses and including a control switching transistor inserted in a power supply circuit in a manner to be turned off during a trace interval. The amount of electric energy accumulated in a resonance circuit is intermittently controlled by the on-off action of such switching transistor, so that the level of the high pulse voltage outputted via the transformer can be maintained constant to consequently enhance the response characteristic in the voltage regulation while minimizing the number of required component elements.

5 Claims, 7 Drawing Sheets t1 - t2 t2 - t3 t3 - t4

HIGH VOLTAGE GENERATOR FOR TELEVISION RECEIVER

BACKGROUND OF THE INVENTION

1. Field of the Invention

The present invention relates to a high voltage generator effectively useful for obtaining a high voltage by boosting a DC voltage supplied from a power source.

2. Description of the Prior Art

In a television receiver, a voltage on the order of 10 kV needs to be supplied as an anode voltage to a cathode-ray tube (CRT).

Normally such a high voltage can be obtained by boosting and rectifying flyback pulses generated in a horizontal output circuit. However, some of the recent television receivers are so contrived that high voltage pulses from a separate high voltage generator based on the same circuit principle as that of a horizontal output circuit are boosted and rectified to produce a high voltage of 30 kV or so which is applied as an anode voltage.

FIG. 6 shows a conventional example of such high voltage generator, wherein there are included a choke coil 1 to which a voltage +B is supplied, a switching transistor 2, a rectifier diode 3, a smoothing capacitor 4, a flyback transformer 5, a pulse generating transistor (hereinafter referred to as output transistor) 6, a damper diode 7, and a resonance capacitor 8.

Flyback pulses generated in a primary coil L1 of the flyback transformer 5 are boosted by a secondary coil L2 thereof and, after conversion into a DC voltage by a high voltage rectifier circuit 9, it is applied as an anode voltage to a cathode-ray tube CRT.

Denoted by 10 is a control circuit for first detecting the anode voltage, then pulse-width modulating the detected voltage and controlling the intermittent on-off action of the switching transistor 2.

In the above conventional example, the DC output voltage of a pulse-width controlled power supply regulator constituted of the aforementioned choke coil 1, switching transistor 2, rectifier diode 3 and smoothing capacitor 4 is supplied to a high voltage generator constituted of the aforementioned flyback transformer 5, switching transistor 6, damper diode 7 and resonance capacitor 8. And when the high voltage output level is varied to rise, the pulse width of the transistor 2 is so controlled as to lower the DC output of the pulse-width controlled power supply regulator, whereby the high voltage output level is maintained constant under control.

However, in the known high voltage generator mentioned above, there exists a problem that, since the DC output voltage is controlled by the pulse-width controlled power supply regulator to control the level of the flyback pulses generated from the flyback transformer 5, it becomes necessary to provide an expensive choke coil 1 and a large-capacity smoothing capacitor 4 to consequently bring about an increase in the production cost.

Furthermore, when there occurs any variation in the high voltage output level, it is difficult to rapidly change the DC output of the pulse-width controlled power supply regulator in compliance with such output level variation, hence failing in improvement of the response characteristic in the high voltage regulation.

Therefore, if a white portion W of a high luminance level is existent in a television image A as illustrated in FIG. 7, a great beam current comes to flow in the CRT relative to such white portion W, and after a resultant drop of the high voltage, the normal high voltage cannot be restored fast in a short time. Thus, the anode voltage is lowered to consequently expand the contour line of the white portion W as represented by a dotted line, hence raising a problem of display distortion caused in the image.

OBJECT AND SUMMARY OF THE INVENTION

The present invention has been accomplished in view of the problems mentioned above. And its object is to provide an improved high voltage generator of a type that generates high voltage pulses by flyback means, wherein a switching transistor is inserted in its power supply circuit in such a manner as to be inverted from an on-state to an off-state during the trace interval of the high voltage generator, and the electric energy accumulated in a resonance circuit is controlled by such switching transistor. In this constitution, the amount of the electric energy stored in the resonance circuit is so controlled that the level of the high pulse voltage outputted via a transformer can be maintained constant, hence improving the resonance characteristic in the high voltage regulation while minimizing the number of required component elements. Since the damper interval posterior to generation of the flyback pulse is averted in executing the above energy control, the output voltage can be controlled with satisfactory compliance to any variation caused in the high voltage output level.

According to one aspect of the present invention, there is provided a high voltage generator having an output transistor, a damper diode and a resonance capacitor connected in parallel with one another, wherein a voltage from a power source is supplied thereto via a coil, and flyback pulses generated due to the resonance by the inductance of the coil and the resonance capacitor are boosted and rectified. The high voltage generator further comprises control switching elements connected between the coil and the power source, a driving circuit for driving the control switching elements, a flywheel diode connected between the output terminal of the control switching elements and the ground, and a control flyback loop with a modulator for controlling the offtime phase of the switching elements in accordance with the high voltage output during the on-time of the output transistor.

DETAILED DESCRIPTION OF THE PREFERRED EMBODIMENT

Figure 1:
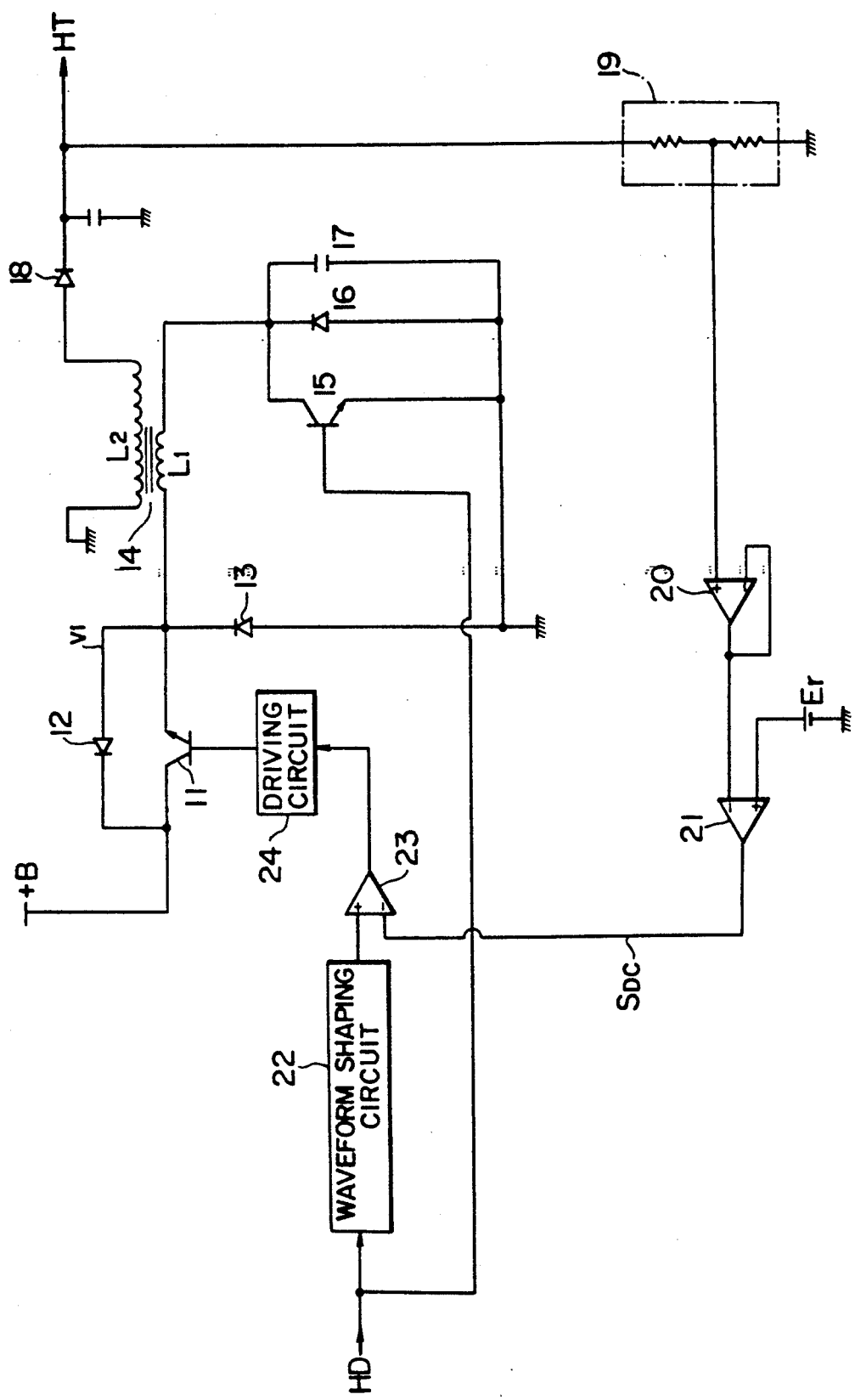
FIG. 1 is a circuit diagram of a high voltage generator embodying the present invention.

FIG. 1 shows an exemplary embodiment of the high voltage generator according to the present invention, including a switching transistor 11 where a power source +B is connected to its collector, and first and second diodes 12, 13.

The emitter of the switching transistor 11 is connected to a flyback transformer 14 partially constituting the high voltage generator, a switching transistor (hereinafter referred to as output transistor) 15 for generating high voltage pulses, a damper diode 16, and a resonance capacitor 17. The capacitor 17 resonates with the flyback transformer 14 during the flyback interval to generate high voltage pulses.

In this embodiment, the voltage of a secondary coil L2 obtained by boosting the high voltage pulse output generated in a primary coil L1 of the flyback transformer 14 is rectified by a diode 18 to serve as an anode voltage for a cathode-ray tube.

Denoted by 19 is a resistor for dividing the anode voltage. The voltage thus divided is then supplied via a buffer amplifier 20 to a first comparator 21 so as to be compared with a reference voltage Er. The output of the first comparator 21 is supplied as a control voltage $S_{DC}$ to a second comparator 23, whose output is used to execute intermittent on-off control of the aforementioned switching transistor 11.

The other terminal of the second comparator 23 is fed with the output of a waveform shaping circuit 22 which shifts horizontal drive pulses HD and shapes the same into a triangular or sawtooth ramp waveform. As will be described later, a control signal PWM pulse-width modulated in accordance with the level of the high voltage level is outputted from the second comparator 23 and then is supplied via a driving circuit 24 to the switching transistor 11.

Figure 2:
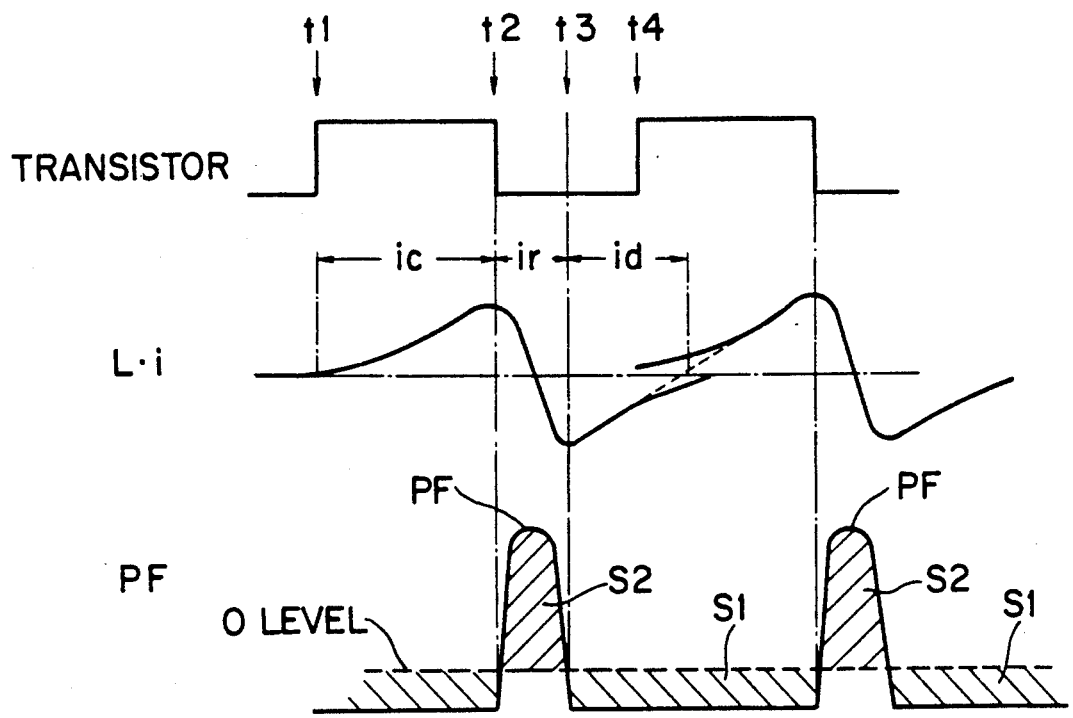
FIG. 2 illustrates the waveform of flyback pulses.

As illustrated in FIGS. 2 and 3, the operation of the high voltage generator is similar to that of a conventional horizontal output circuit and generates flyback pulses during the off-time of the output transistor 15.

Figure 3A:
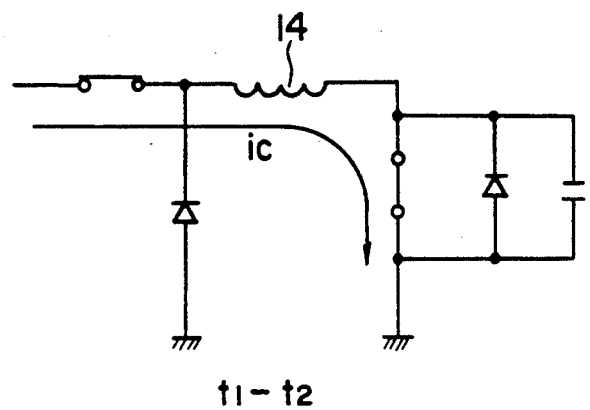
FIG. 3(a), 3(b) and 3(c) are circuit diagrams for explaining a flyback operation.

That is, in a trace interval (also termed a transistor interval) t1-t2 during which the output transistor 15 is in its on-state with the voltage +B being supplied to the flyback transformer 14, the gradually increasing collector current ic comes to flow as indicated by an arrow in FIG. 3(a), so that electromagnetic energy is accumulated in the primary coil L1 of the flyback transformer 14.

Figure 3B:
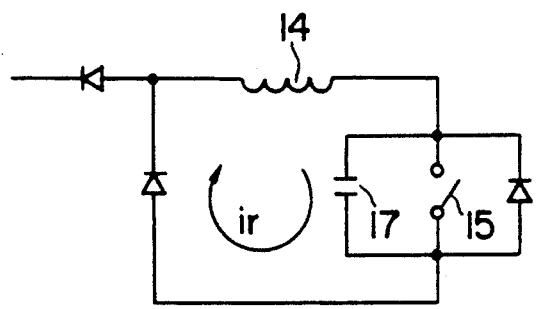

When the output transistor 15 is driven to be turned off next time, the electromagnetic energy produces a resonance current ir to charge the resonance capacitor 17 during the flyback interval t2-t3, as shown in FIG. 3(b), and a high-voltage flyback pulse PF is generated on the secondary side of the flyback transformer 14 by such resonance current ir.

Figure 3C:
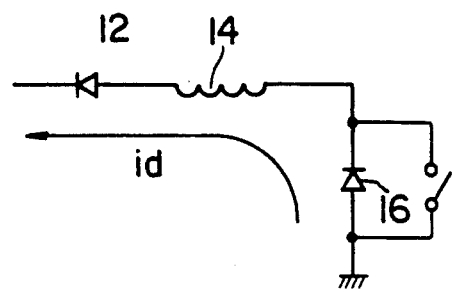

Subsequently, when the polarity of the resonance current ir is inverted and the electrostatic energy in the resonance capacitor 17 is converted to electromagnetic energy in the flyback transformer 14, the damper diode 16 is turned on so that a damper current id comes to flow during the damper interval t3-t4, as shown in FIG. 3(c).

Thereafter the above operation is repeated to cause flow of a sawtooth current in the coil of the flyback transformer 14, whereby a flyback pulse PF is generated in the flyback interval. In this case, the peak value of the flyback pulse PF is such that, as shown in FIG. 2, the two areas S1 and S2 above and below the zero-level reference line of the alternating signal becomes equal to each other. That is, the level of each flyback pulse rises in accordance with an increase of the electromagnetic energy accumulated in the transistor interval t1-t2 during which the output transistor 15 is kept in its on-state.

Therefore the present invention is so contrived that the amount of the electromagnetic energy accumulated in the flyback transformer 14 is controlled through intermittent on-off control of the switching transistor 11, whereby the high voltage output level is maintained constant.

Figure 4:
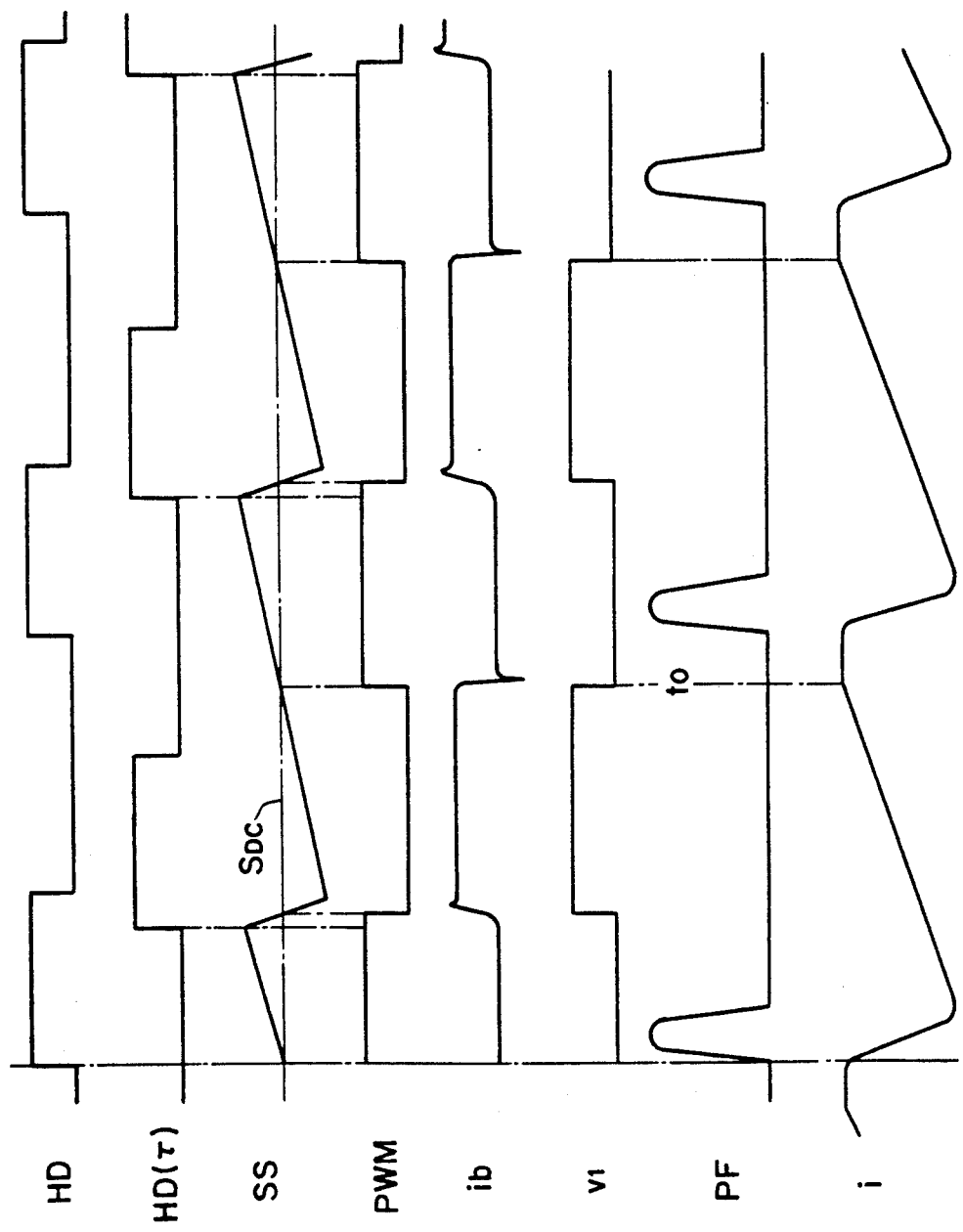
FIG. 4 illustrates the waveforms of signals in the embodiment of FIG. 1.

FIG. 4 is a signal waveform chart representing the operation of the high voltage generator shown in FIG. 1.

This waveform chart includes horizontal drive pulses HD formed out of a synchronizing signal, a signal HD ($\tau$) obtained by delaying the horizontal drive pulse HD for a time $\tau$, and a ramp signal SS formed out of such signal HD ($\tau$).

The ramp signal SS is compared with a voltage $S_{DC}$ outputted from the first comparator 21, so as to produce a control signal PWM pulse-width modulated by the level of the voltage $S_{DC}$. Then a base current ib is fed to the switching transistor 11 in accordance with such control signal PWM, so that the on-ff action of the switching transistor 11 is controlled and its output voltage vl is supplied to the flyback transformer 14.

The output transistor 15 is so inverted as to be turned off at least in the flyback interval by the horizontal drive pulse, and a flyback pulse is generated in the flyback transformer 14 as mentioned.

Figure 5A:
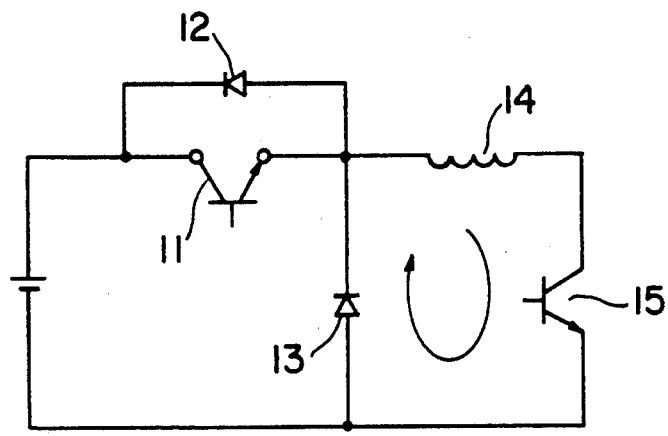
FIG. 5(a) shows an off-time current obtained in a switching operation.

Since the output voltage vl of the switching transistor 11 is interrupted under control anterior to the flyback interval, the collector current ic flowing in the flyback transformer 14 at an instant t0 comes to flow via the second diode 13 after such interruption, as shown in FIG. 5(a).

Figure 5B:
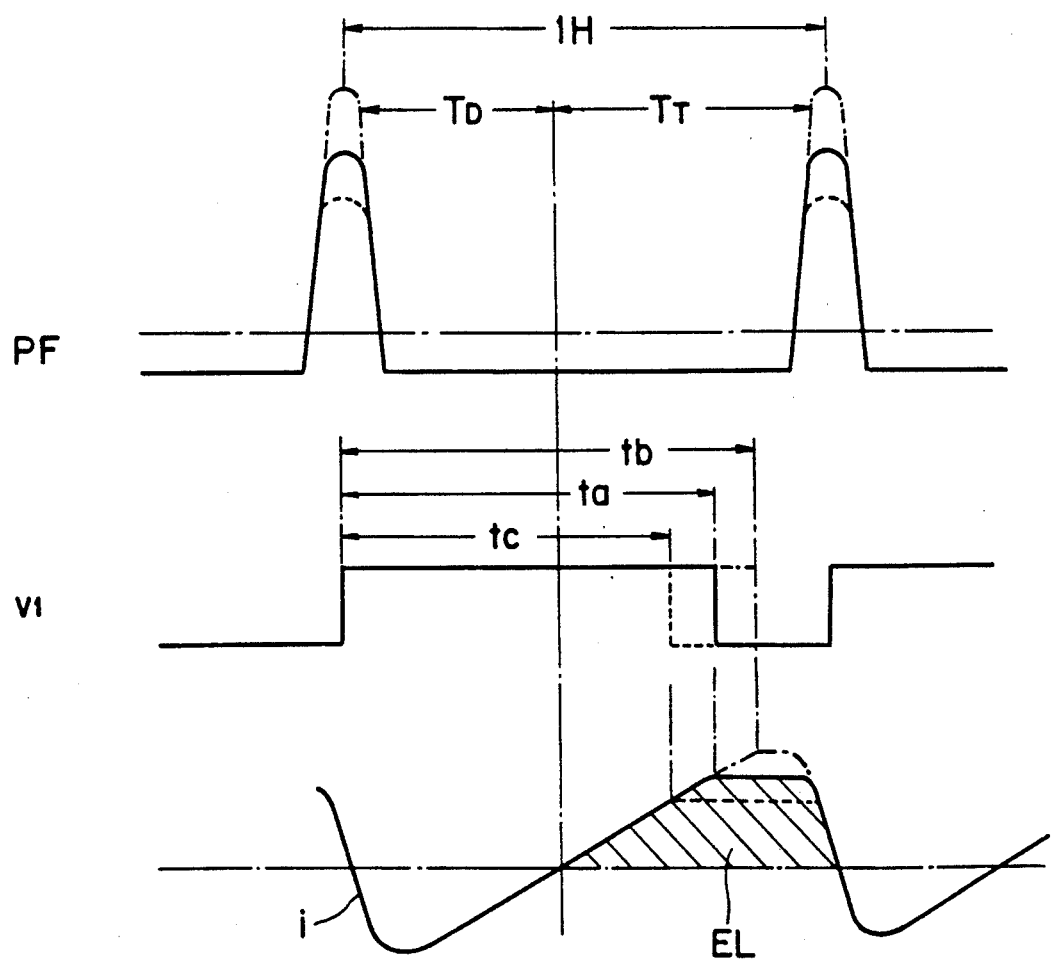
FIG. 5(b) shows the peak value of a flyback pulse.

Consequently, when the interval ta for supply of the output voltage Vl is reduced to a shorter interval to as shown in FIG. 5(b) by controlling the switching transistor 11, the electromagnetic energy (area EL) accumulated in the flyback transformer 14 is also reduced as represented by a dotted line. Meanwhile, if such interval ta is extended to a longer interval tb, the electromagnetic energy accumulated in the flyback transformer 14 is increased as represented by a one-dot chain line.

The peak value of the flyback pulse is also changed in accordance with the amount of the electromagnetic energy accumulated in the flyback transformer 14, as shown in FIG. 5(b). Therefore, if the circuit is so formed that the pulse width of the control signal PWM is changed in conformity with the high voltage output level as devised in the embodiment of FIG. 1, it follows that the high voltage supplied to the cathode-ray tube can be maintained constant under control.

Figure 6:
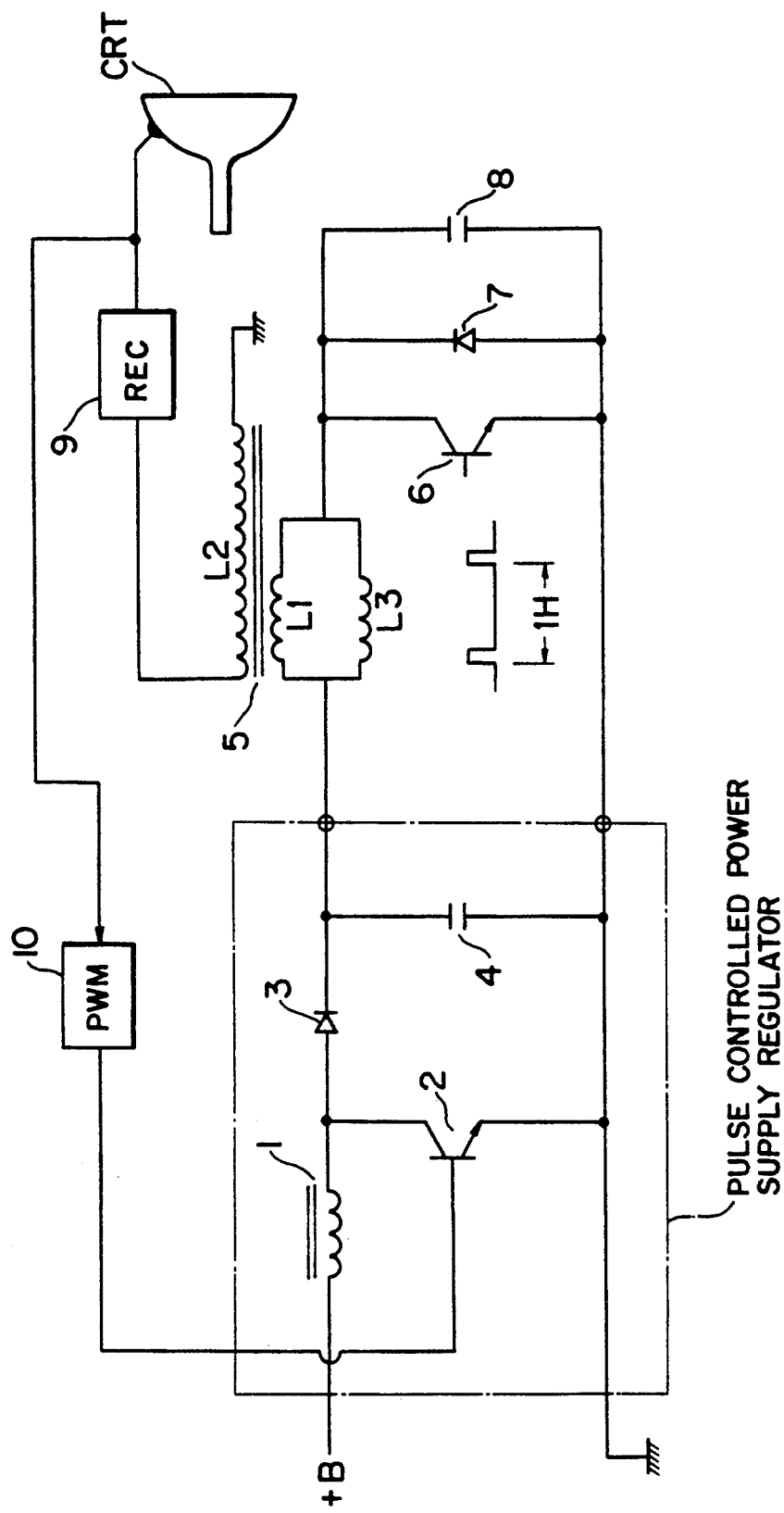
FIG. 6 is a wiring diagram of a conventional exemplary high voltage generator.
Figure 7:
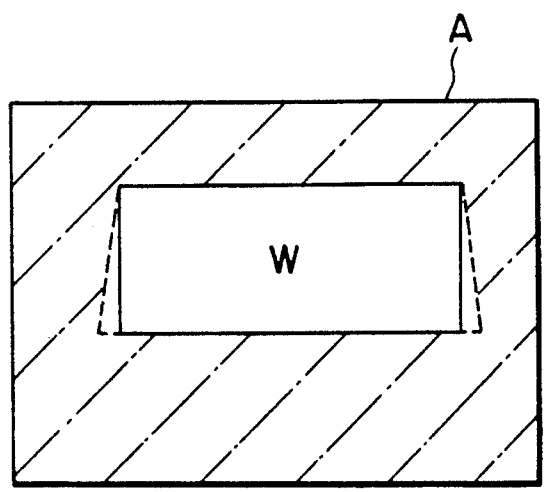
FIG. 7 illustrates an image on a television screen.

In the presennt invention, the amount of the input energy is controlled per horizontal period without using the smoothing capacitor 4 in the known prior art of FIG. 6, whereby the response characteristic can be rendered remarkably high. Thus, the high voltage variation or ripple caused in one field (vertical period) can be diminished to consequently bring about a wide reduction of the image distortion based on such ripple.

In the embodiment of FIG. 1, a pulse width modulator is employed for controlling the off-time phase of the transistor 11. However, such modulator may be replaced with a variable pulse phase shifter.

As described hereinabove, the high voltage generator of the present invention incorporates a switching transistor which is so controlled as to be turned on during a damper interval or conduction of a damper diode and is turned off during a transistor interval or conduction of an output transistor, and the amount of electric energy accumulated in a resonance circuit is controlled by the on-off action of such switching transistor, so that there is achievable an advantageous effect of rapidly obtaining a constant high voltage in response to any variation caused in the high voltage output level.

What is claimed is:

1. A high voltage generator wherein a voltage from a power source is supplied via a coil to an output transistor, a damper diode and a resonance capacitor connected in parallel with one another, and flyback pulses generated due to the resonance by the inductance of said coil and said resonance capacitor are boosted and rectified, said high voltage generator further comprising:
   (a) control switching elements 11, 12 connected between said coil and said power source;
   (b) a driving circuit 24 for driving said control switching elements;
   (c) a flywheel diode 13 connected between the output terminal of said control switching elements and the ground; and
   (d) a control feedback loop with a modulator for controlling the off-time phase of said switching elements in accordance with the high voltage output during the on-time of said output transistor.

2. A high voltage generator according to claim 1, wherein said control switching elements are a transistor and a diode connected in parallel thereto inversely.

3. A high voltage generator according to claim 1, wherein said control feedback loop includes an error detecting first comparator 21, and a second comparator 23 for producing a pulse-width modulated output by comparing the output of said first comparator with a ramp waveform of a horizontal period; and the output of said second comparator is supplied to said driving circuit.

4. A high voltage generator according to claim 1, wherein said coil is a primary winding of a flyback transformer.

5. A high voltage generator according to claim 1, wherein said modulator consists of a phase shifter for advancing the on-time phase of said control switching elements when the high voltage output is varied to rise.

* * * * *